United States Patent
Song

(10) Patent No.: US 11,726,694 B2
(45) Date of Patent: Aug. 15, 2023

(54) STORAGE DEVICE AND OPERATING METHOD THEREOF

(71) Applicant: SK hynix Inc., Gyeonggi-do (KR)

(72) Inventor: Min O Song, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 52 days.

(21) Appl. No.: 17/475,643

(22) Filed: Sep. 15, 2021

(65) Prior Publication Data
US 2022/0308782 A1  Sep. 29, 2022

(30) Foreign Application Priority Data
Mar. 25, 2021 (KR) .................. 10-2021-0039125

(51) Int. Cl.
*G06F 3/06* (2006.01)
(52) U.S. Cl.
CPC ............ *G06F 3/0647* (2013.01); *G06F 3/064* (2013.01); *G06F 3/0604* (2013.01); *G06F 3/0635* (2013.01); *G06F 3/0659* (2013.01); *G06F 3/0673* (2013.01)
(58) Field of Classification Search
CPC ...... G06F 3/0604; G06F 3/0635; G06F 3/064; G06F 3/0647; G06F 3/0659; G06F 3/0673
See application file for complete search history.

(56) References Cited

U.S. PATENT DOCUMENTS

2019/0220397 A1* 7/2019 Lee ..................... G11C 11/5642

FOREIGN PATENT DOCUMENTS

| KR | 1020190009580 A | 1/2019 |
| KR | 1020190128498 A | 11/2019 |
| KR | 1020200059774 A | 5/2020 |

* cited by examiner

Primary Examiner — Yong J Choe
(74) Attorney, Agent, or Firm — IP & T Group LLP

(57) ABSTRACT

The present disclosure relates to an electronic device. A memory controller controlling a memory package including a plurality of memory dies each including a plurality of memory blocks, the plurality of memory blocks controlled in units of super blocks each including at least one memory block selected from each of the plurality of memory dies includes a reclaim information storage storing reclaim information including read counts and migration level information related to the read counts, and a read reclaim controller migrating data stored in a target block having a read count exceeding a threshold count, and victim blocks selected according to the reclaim information to another super block different from a super block to which the target block belongs, wherein the victim blocks include memory blocks whose migration level information is the highest among memory blocks included in memory dies different from a memory die including the target block.

20 Claims, 13 Drawing Sheets

FIG. 5

| BLOCK NUMBER \ DIE NUMBER | DIE 0 | DIE 1 | DIE 2 | DIE 3 |
|---|---|---|---|---|
| BLK 0 | 50k | 140k | 200k | 100k |
| BLK 1 | 110k | 180k | 50k | 140k |
| BLK 2 | 50k | 10k | 10k | 150k |
| BLK 3 | 115k | 120k | 100k | 10k |

FIG. 7B

| DIE NUMBER / BLOCK NUMBER | DIE 0 | DIE 1 | DIE 2 | DIE 3 |
|---|---|---|---|---|
| BLK 0 | Lv 1 | Lv 2 | Lv 4 | Lv 2 |
| BLK 1 | Lv 2 | Lv 3 | Lv 1 | Lv 2 |
| BLK 2 | Lv 1 | Lv 0 | Lv 0 | Lv 3 |
| BLK 3 | Lv 2 | Lv 2 | Lv 2 | Lv 0 |

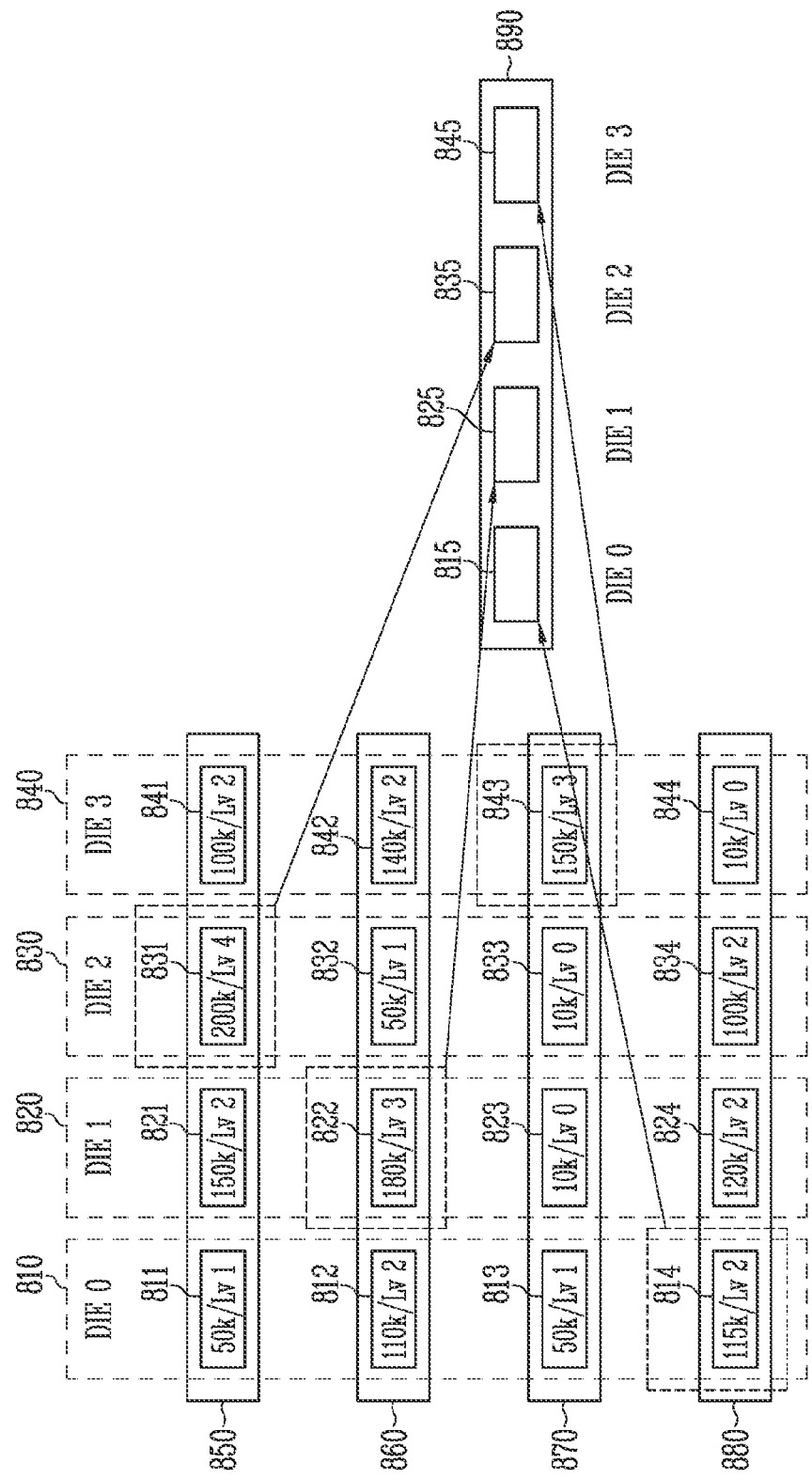

STORAGE DEVICE AND OPERATING METHOD THEREOF

CROSS-REFERENCE TO RELATED APPLICATION

The present application claims priority under 35 U.S.C. § 119(a) to Korean patent application number 10-2021-0039125 filed on Mar. 25, 2021, the entire disclosure of which is incorporated by reference herein.

BACKGROUND

1. Technical Field

Various embodiments of the present disclosure relate generally to an electronic device, and more particularly, to a storage device and a method of operating the storage device.

2. Related Art

Recently, a paradigm for the computer environment has changed into ubiquitous computing which makes a computer system available at any time from any location. Therefore, the use of portable electronic devices such as cellular phones, digital cameras, and laptop computers, has surged. A portable electronic device generally uses a memory system using a memory device, i.e., a data storage device. The data storage device serves as a main storage device or an auxiliary storage device of the portable electronic device.

The data storage device using the memory device has excellent stability and durability since it does not have any mechanical driving parts. In addition, the data storage device also provides faster information access speed and has low power consumption. Examples of a data storage device that is embodied into a memory system having these advantages may include a universal serial bus (USB), a memory card having various interfaces, and a solid state drive (SSD).

Memory devices are generally classified into volatile memory devices and nonvolatile memory devices.

Nonvolatile memory devices operate at relatively low write and read speeds, but they may retain stored data in the absence of a power supply. Therefore, nonvolatile memory devices may be used when there is the need for storing data which should be retained regardless of supply of power. Examples of the nonvolatile memory devices include Read Only Memory (ROM), Mask ROM (MROM), Programmable ROM (PROM), Erasable Programmable ROM (EPROM), Electrically Erasable and Programmable ROM (EEPROM), flash memory, Phase-change Random Access Memory (PRAM), Magnetic RAM (MRAM), Resistive RAM (RRAM), and Ferroelectric RAM (FRAM). Flash memories may be generally classified into NOR-type memories and NAND-type memories.

SUMMARY

Various embodiments of the present disclosure are directed to a storage device performing an improved read reclaim operation and an operating method of the storage device.

According to an embodiment of the present disclosure, a memory controller controlling a memory package including a plurality of memory dies each including a plurality of memory blocks, the plurality of memory blocks controlled in units of super blocks each including at least one memory block selected from each of the plurality of memory dies may include a reclaim information storage storing reclaim information including read counts of the plurality of memory blocks and migration levels related to the read counts, and a read reclaim controller migrating data stored in a target block and victim blocks to another super block different from a super block to which the target block belongs, the target block being a memory block having a read count exceeding a threshold count, among the plurality of memory blocks, and the victim blocks being selected according to the reclaim information, wherein the victim blocks include one or more memory blocks whose the migration level indicates the highest migration level, among memory blocks, which are included in memory dies different from a memory die including the target block.

According to an embodiment of the present disclosure, a storage device may include a memory package including a plurality of memory dies including a plurality of memory blocks, and a memory controller controlling the plurality of memory blocks in units of super blocks each including memory blocks selected from the plurality of memory dies, wherein the memory controller comprises: a reclaim information storage storing reclaim information including read counts of the plurality of memory blocks and migration levels related to reliability of data stored in the plurality of memory blocks, and a read reclaim controller migrating data stored in a target block and a plurality of victim blocks to another super block different from a super block to which the target block belongs, the target block being a memory block having a read count exceeding a threshold count, among the plurality of memory blocks, and the plurality of victim blocks being selected according to the reclaim information, wherein the migration levels includes migration levels corresponding to a plurality of read count ranges to which the read counts of the plurality of memory blocks belong, and wherein the read reclaim controller selects, as the victim blocks, a set number of memory blocks in descending order from a highest migration level among the plurality of memory blocks.

According to an embodiment of the present disclosure, a method of operating a memory controller controlling a memory package including a plurality of memory dies each including a plurality of memory blocks, the plurality of memory blocks controlled in units of super blocks each including at least one memory block selected from each of the plurality of memory dies may include storing reclaim information including read counts of the plurality of memory blocks and migration levels related to the read count, and migrating data stored in a target block and a plurality of victim blocks to another super block different from a super block to which the target block belongs, the target block being a memory block having a read count exceeding a threshold count, among the plurality of memory blocks, and the plurality of victim blocks being selected according to the reclaim information, wherein the plurality of victim blocks include one or more memory blocks whose the migration level indicates the highest migration level among memory blocks which are included in other memory dies different from the memory die including the target block.

According to an embodiment of the present disclosure, a storage device may include a plurality of memory dies including a plurality of memory blocks and a memory controller configured to perform a read operation on a target memory block of a target memory die among the plurality of memory dies, the target memory block belonging to a target super block in a plurality of super blocks, each super block including multiple memory blocks, which are selected from the plurality of memory dies, respectively, update a read count of the target memory block based on the read operation, determine migration levels of the plurality of memory blocks based on the updated read count of the target memory block and read counts of the remaining memory blocks among the plurality of memory blocks, each of the migration levels proportional to read counts, determine a victim block from each of remaining memory dies excluding the target memory die among the plurality of memory dies when the updated read count is greater than a threshold read count, the victim block being a memory block having a highest migration level among memory blocks in each of the remaining memory dies and migrate data stored in the target memory block of the target memory die and victim blocks of the remaining memory dies to an open super block excluding super blocks including the target memory block and the victim blocks, among the plurality of super blocks.

BRIEF DESCRIPTION OF THE DRAWINGS

FIG. 5 is a diagram illustrating a super block included in a memory package of FIG. 1 according to an embodiment of the present disclosure;

FIG. 7B illustrates a table storing migration level information of each of memory blocks according to an embodiment of the present disclosure;

FIG. 8 is a diagram illustrating a read reclaim operation according to an embodiment of the present disclosure;

DETAILED DESCRIPTION

Figure 1:
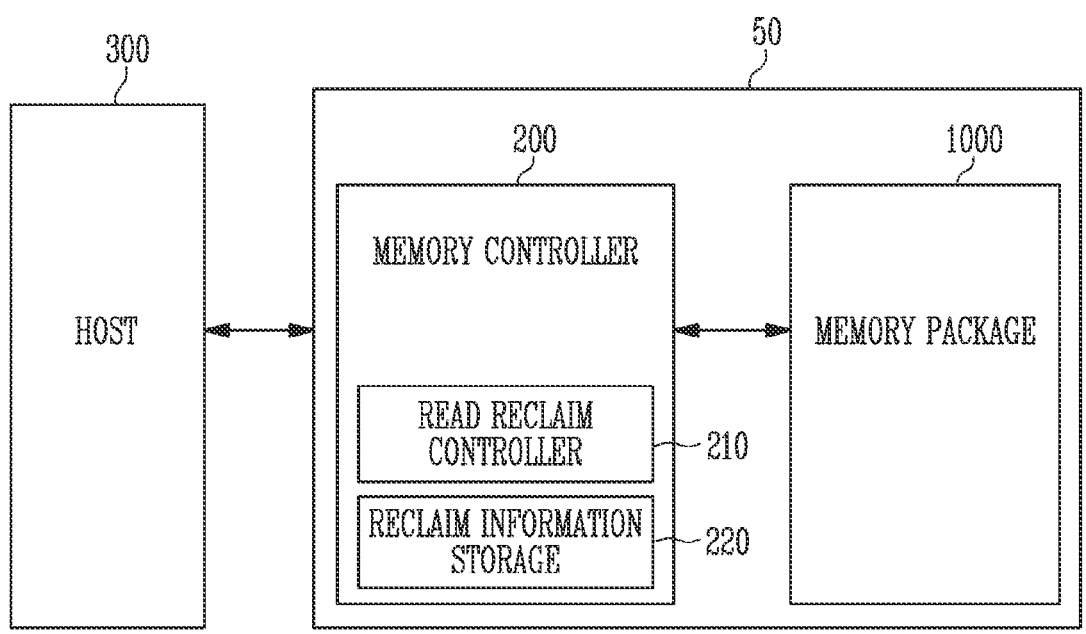
FIG. 1 is a diagram illustrating a storage device including a memory device according to an embodiment of the present disclosure.

Specific structural or functional descriptions of embodiments in accordance with concepts of the present disclosure which are disclosed in this specification are illustrated only to describe the embodiments in accordance with the concepts and the embodiments in accordance with the concepts may be carried out by various forms but the descriptions are not limited to the embodiments described in this specification.

Various modifications and changes may be applied to the embodiments in accordance with the concepts so that the embodiments will be illustrated in the drawings and described in the specification. However, the embodiments according to the concept of the present disclosure should not be construed as limited to specified disclosure, and include all changes, equivalents, or substitutes that do not depart from the spirit and technical scope of the present disclosure.

While terms such as "first" and "second" may be used to describe various components, such components must not be understood as being limited to the above terms. The above terminologies are used to distinguish one component from the other component, for example, a first component may be referred to as a second component without departing from a scope in accordance with the concept of the present disclosure and similarly, a second component may be referred to as a first component.

It will be understood that when an element is referred to as being "connected" or "coupled" to another element, it can be directly connected or coupled to the other element or intervening elements may also be present. In contrast, when an element is referred to as being "directly connected" or "directly coupled" to another element, no intervening elements are present. Other expressions describing relationships between components such as "~between," "immediately ~between" or "adjacent to ~" and "directly adjacent to ~" may be construed similarly.

The terms used in the present disclosure are merely used to describe particular embodiments, and are not intended to limit the present disclosure. Singular forms in the present disclosure are intended to include the plural forms as well, unless the context clearly indicates otherwise. In the present specification, it should be understood that the terms "include" or "have" indicate that a feature, a number, a step, an operation, a component, a part or the combination those of described in the specification is present, but do not exclude a possibility of presence or addition of one or more other features, numbers, steps, operations, components, parts or combinations thereof, in advance.

So far as not being differently defined, all terms used herein including technical or scientific terminologies have meanings that are commonly understood by those skilled in the art to which the present disclosure pertains. The terms defined in generally used dictionaries should be construed as having the same meanings as would be construed in the context of the related art, and unless clearly defined otherwise in this specification, should not be construed as having idealistic or overly formal meanings.

In some embodiments, well-known processes, device structures, and technologies will not be described in detail to avoid ambiguousness of the present invention. This intends to disclose the gist of the present disclosure more clearly by omitting unnecessary description.

Hereinafter, embodiments of the present disclosure will be described in detail with reference to the accompanying drawings in order for those skilled in the art to be able to readily implement the technical spirit of the present disclosure.

FIG. 1 is a diagram illustrating a storage device 50 including a memory device according to an embodiment of the present disclosure.

Referring to FIG. 1, the storage device 50 may include a memory package 1000 and a memory controller 200 controlling operations of the memory package 1000. The storage device 50 may be configured to store data in response to control of a host 300. Examples of the storage device 50 may include a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a communication standard or interface with the host 300. For example, the storage device 50 may be configured as any of various types of storage devices such as a solid state drive (SSD), a multimedia card in the form of an MMC, an eMMC, an RS-MMC and a micro-MMC, a secure digital card in the form of a secure digital (SD), a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-e or PCIe) card type storage device, a compact flash (CF) card, a smart media card, and a memory stick.

The storage device 50 may be manufactured in any of various types of packages. For example, the storage device 50 may be manufactured as any package type, such as a package-on-package (POP), a system-in-package (SIP), a system-on-chip (SOC), a multi-chip package (MCP), a chip-on-board (COB), a wafer-level fabricated package (WFP), a wafer-level stack package (WSP) and the like.

The memory package 1000 may store data. The memory package 1000 may operate in response to control of the memory controller 200. A plurality of memory devices that store the data included in the memory package 1000 may include a memory cell array (not shown) which includes memory cells.

Each of the memory cells may be configured as a Single Level Cell (SLC) storing one bit of data, a Multi-Level Cell (MLC) storing two bits of data, a Triple Level Cell (TLC) storing three bits of data, or a Quad Level Cell (QLC) storing four bits of data.

A memory cell array (not shown) may include a plurality of memory blocks. Each of the memory blocks may include a plurality of memory cells. Each memory block may include a plurality of pages. According to an embodiment, a page may be a unit for storing data in the memory package 1000, or a unit for reading the data stored in the memory package 1000. The memory block may be a unit for erasing data.

According to an embodiment, examples of the memory package 1000 may include Double Data Rate Synchronous Dynamic Random Access Memory (DDR SDRAM), Low Power Double Data Rate4 (LPDDR4) SDRAM, Graphics Double Data Rate (GDDR) SDRAM, Low Power DDR (LPDDR), Rambus Dynamic Random Access Memory (RDRAM), NAND flash memory, vertical NAND flash memory, NOR flash memory, resistive random access memory (RRAM), phase-change random access memory (PRAM), magnetoresistive random access memory (MRAM), ferroelectric random access memory (FRAM), and spin transfer torque random access memory (STT-RAM). By way of example and without any limitation, the memory package 1000 is a NAND flash memory.

The memory package 1000 may receive a command CMD and an address ADDR from the memory controller 200. The memory package 1000 may be configured to access an area selected to the received address in the memory cell array. The memory package 1000 may perform an operation corresponding to the received command CMD on the area selected by the address ADDR. For example, the memory package 1000 may perform a program operation, a read operation and an erase operation. During a program operation, the memory package 1000 may store data in the area selected by the address ADDR. During a read operation, the memory package 1000 may read data from the area selected by the address ADDR. During an erase operation, the memory package 1000 may erase data stored in the area selected by the address ADDR.

According to an embodiment, the memory package 1000 may include a plurality of planes. The planes may refer to units such that they independently perform one or more operations. For example, the memory package 1000 may include two, four or eight planes. A plurality of planes may independently perform a program operation, a read operation, or an erase operation at the same time.

The memory controller 200 may control general operations of the storage device 50.

When power is applied to the storage device 50, the memory controller 200 may execute firmware FW. When the memory package 1000 is a flash memory device, the firmware FW may include a host interface layer (HIL) controlling communication with the host 300, a flash translation layer (FTL) controlling communication between the host 300 and the memory package 1000, and a flash interface layer (FIL) controlling communication with the memory package 1000.

According to an embodiment, the memory controller 200 may include a read reclaim controller 210 that controls the memory package 1000 to perform a read reclaim operation and a reclaim information storage 220 that stores information relating to the read reclaim operation.

In an embodiment, the memory controller 200 may receive write data and a Logical Block Address (LBA) from the host 300, and may translate the logical block address LBA into a Physical Block Address (PBA) that indicates an address of memory cells in which data included in the memory package 1000 is to be stored. In the specification, the logical block address LBA may have the same meaning as a "logical address" or a "logic address." In the specification, the physical block address PBA may have the same meaning as a "physical address" or a "physic address."

The memory controller 200 may control the memory package 1000 to perform a program operation, a read operation or an erase operation in response to the request of the host 300. During a program operation, the memory controller 200 may provide a program command, the physical block address PBA, and data to the memory package 1000. During a read operation, the memory controller 200 may provide a read command and the physical block address PBA to the memory package 1000. During an erase operation, the memory controller 200 may provide an erase command and the physical block address PBA to the memory package 1000.

According to an embodiment of the present disclosure, the memory controller 200 may generate commands, addresses, and data and transfer them to the memory package 1000 regardless of a request from the host 300. For example, the memory controller 200 may provide commands, addresses, and data for performing a read operation and program operations involved in performing wear leveling, read reclaim and garbage collection.

In another embodiment, the memory controller 200 may control a read operation of the memory package 1000, determine deterioration characteristics of memory cells on which the read operation is performed according to a result of the read operation, and perform a read reclaim operation to improve retention characteristics of the memory cells. The memory controller 200 may perform a read reclaim operation to improve deterioration of threshold voltage values of the memory cells.

According to an embodiment, the memory controller 200 may control at least two memory packages 1000. The memory controller 200 may control the memory packages 1000 in an interleaving scheme in order to improve operating performance. According to an interleaving scheme, operations on at least two memory packages 1000 may overlap each other. However, according to the interleaving scheme, at least two memory packages 1000 may operate in parallel.

A buffer memory (not shown) may temporarily store data provided from the host 300, i.e., data to be stored in the memory package 1000, or may temporarily store data read from the memory package 1000. According to an embodiment, the buffer memory may be a volatile memory device. For example, the buffer memory (not shown) may be a Dynamic Random Access Memory (DRAM) or a Static Random Access Memory (SRAM).

The host 300 may communicate with the storage device 50 using at least one of various communication standards or interfaces such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
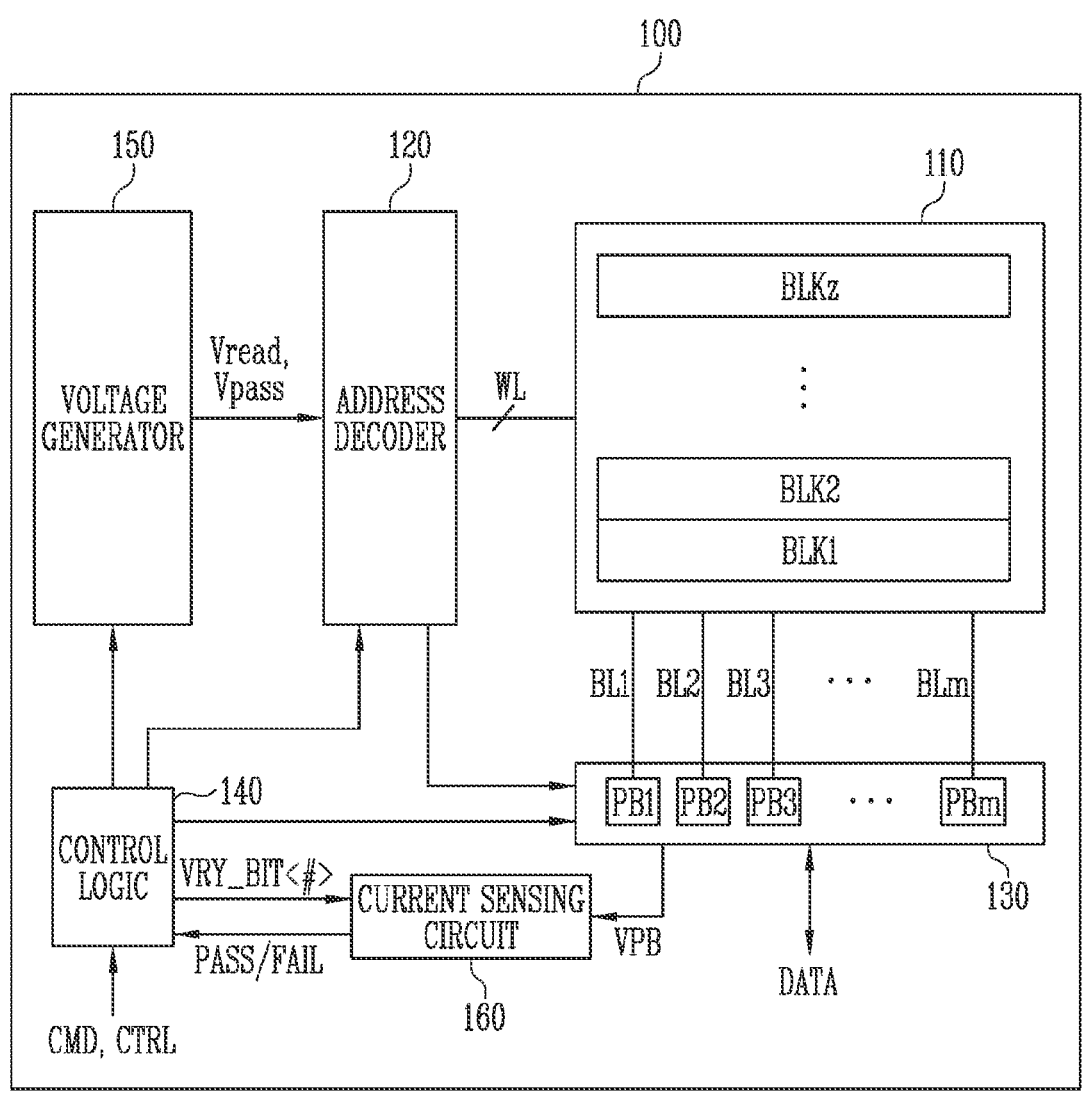
FIG. 2 is a diagram illustrating a memory device included in a memory package of FIG. 1 according to an embodiment of the present disclosure.

FIG. 2 is a diagram illustrating a memory device 100 included in the memory package 1000 of FIG. 1 according to an embodiment of the present disclosure.

Referring to FIG. 2, the memory device 100 may include a memory cell array 110, an address decoder 120, a read and write circuit 130, a control logic 140, a voltage generator 150, and a current sensing circuit 160. The address decoder 120, the read and write circuit 130, the voltage generator 150 and the current sensing circuit 160 may be collectively referred to as a peripheral circuit which is controlled by the control logic 140.

The memory cell array 110 may include a plurality of memory blocks BLK1 to BLKz. The plurality of memory blocks BLK1 to BLKz may be coupled to the address decoder 120 through word lines WL. The plurality of memory blocks BLK1 to BLKz may be coupled to the read and write circuit 130 through bit lines BL1 to BLm. Each of the plurality of memory blocks BLK1 to BLKz may include a plurality of memory cells. According to an embodiment, the plurality of memory cells may be non-volatile memory cells that have a vertical channel structure. The memory cell array 110 may have a two-dimensional structure. However, according to an embodiment, the memory cell array 110 may have a three-dimensional structure. Each of the plurality of memory cells included in the memory cell array 110 may store at least one bit of data. According to an embodiment, each of the plurality of memory cells included in the memory cell array 110 may be a single-level cell (SLC) storing 1-bit data. According to another embodiment, each of the plurality of memory cells included in the memory cell array 110 may be a multi-level cell (MLC) that stores 2-bit data. According to another embodiment, each of the plurality of memory cells included in the memory cell array 110 may be a triple-level cell (TLC) that stores three bits of data.

According to another embodiment, each of the plurality of memory cells included in the memory cell array 110 may be a quad-level cell (QLC) that stores four bits of data. According to an embodiment, each of the plurality of memory cells included in the memory cell array 110 may store five or more bits of data.

The address decoder 120 may be coupled to the memory cell array 110 through word lines WL. The address decoder 120 may be controlled by the control logic 140. The address decoder 120 may receive an address through an input/output buffer (not illustrated) in the memory device 100.

The address decoder 120 may be configured to decode a block address of the received address. The address decoder 120 may select at least one memory block according to the decoded block address. In addition, during a read voltage applying operation, the address decoder 120 may apply a read voltage Vread generated by the voltage generator 150 to a selected word line of a selected memory block and may apply a pass voltage Vpass to unselected word lines. In addition, during a program verify operation, the address decoder 120 may apply a verify voltage generated by the voltage generator 150 to the selected word line of the selected memory block, and may apply the pass voltage Vpass to unselected word lines.

The address decoder 120 may be configured to decode a column address of the received address. The address decoder 120 may transfer the decoded column address to the read and write circuit 130.

A read operation and a program operation of the memory device 100 may be performed in units of pages. An address which is received at the request of a read operation and a program operation may include a block address, a row address, and a column address. The address decoder 120 may select one memory block and one word line in response to the block address and the row address. The column address may be decoded by the address decoder 120 and provided to the read and write circuit 130. In the present disclosure, memory cells coupled to one word line may be referred to as a "physical page."

The read and write circuit 130 may include a plurality of page buffers PB1 to PBm. The read and write circuit 130 may operate as a read circuit during a read operation of the memory cell array 110 and a write circuit during a write operation thereof. The page buffers PB1 to PBm may be coupled to the memory cell array 110 through the bit lines BL1 to BLm. The page buffers PB1 to PBm may continuously supply a sensing current to bit lines coupled to memory cells in order to sense threshold voltages of memory cells, and may sense changes in an amount of current caused by program states of memory cells corresponding thereto through a sensing node to latch sensing data during a read operation and a program verify operation. The read and write circuit 130 may operate in response to page buffer control signals output from the control logic 140. In the specification, a write operation of the write circuit may refer to a program operation with respect to selected memory cells.

The read and write circuit 130 may sense data of a memory cell, temporarily store the read data, and output data DATA to an input/output buffer (not illustrated) of the memory device 100 during a read operation. According to an embodiment, the read and write circuit 130 may include a column selector in addition to the page buffers PB1 to PBm (or page registers). According to an embodiment of the present disclosure, the read and write circuit 130 may be a page buffer.

The control logic 140 may be coupled to the address decoder 120, the read and write circuit 130, the voltage generator 150, and the current sensing circuit 160. The control logic 140 may receive the command CMD and a control signal CTRL through the input/output buffer (not illustrated) of the memory device 100. The control logic 140 may be configured to control general operations of the memory device 100 in response to the control signal CTRL. In addition, the control logic 140 may output a control signal to control sensing node precharge potential levels of the page buffers PB1 to PBm. The control logic 140 may control the read and write circuit 130 to perform a read operation of the memory cell array 110.

The control logic 140 may determine whether a verify operation on a predetermined target program state has passed or failed in response to a pass signal PASS or a fail signal FAIL.

The voltage generator 150 may generate the read voltage Vread and the pass voltage Vpass in response to a control signal output from the control logic 140 during a read operation. The voltage generator 150 may include a plurality of pumping capacitors receiving an internal power voltage to generate a plurality of voltages having various voltage levels, and may generate a plurality of voltages by selectively activating the plurality of pumping capacitors in response to control of the control logic 140.

The current sensing circuit 160 may generate a reference current and a reference voltage in response to an allowable bit VRY_BIT<#> which is received from the control logic 140 during a verify operation. The current sensing circuit 160 may compare the generated reference voltage with a sensing voltage VPB received from the page buffers PB1 to PBm included in the read and write circuit 130, or may compare the generated reference current with a sensing current received from the page buffers PB1 to PBm included in the read and write circuit 130 to thereby output the pass signal PASS or the fail signal FAIL.

The address decoder 120, the read and write circuit 130, the voltage generator 150, and the current sensing circuit 160 may function as a 'peripheral circuit' configured to perform a read operation, a write operation, and an erase operation on the memory cell array 110. The control logic 140 may control the peripheral circuit to perform a read operation, a write operation, and an erase operation on the memory cell array 110.

Figure 3:
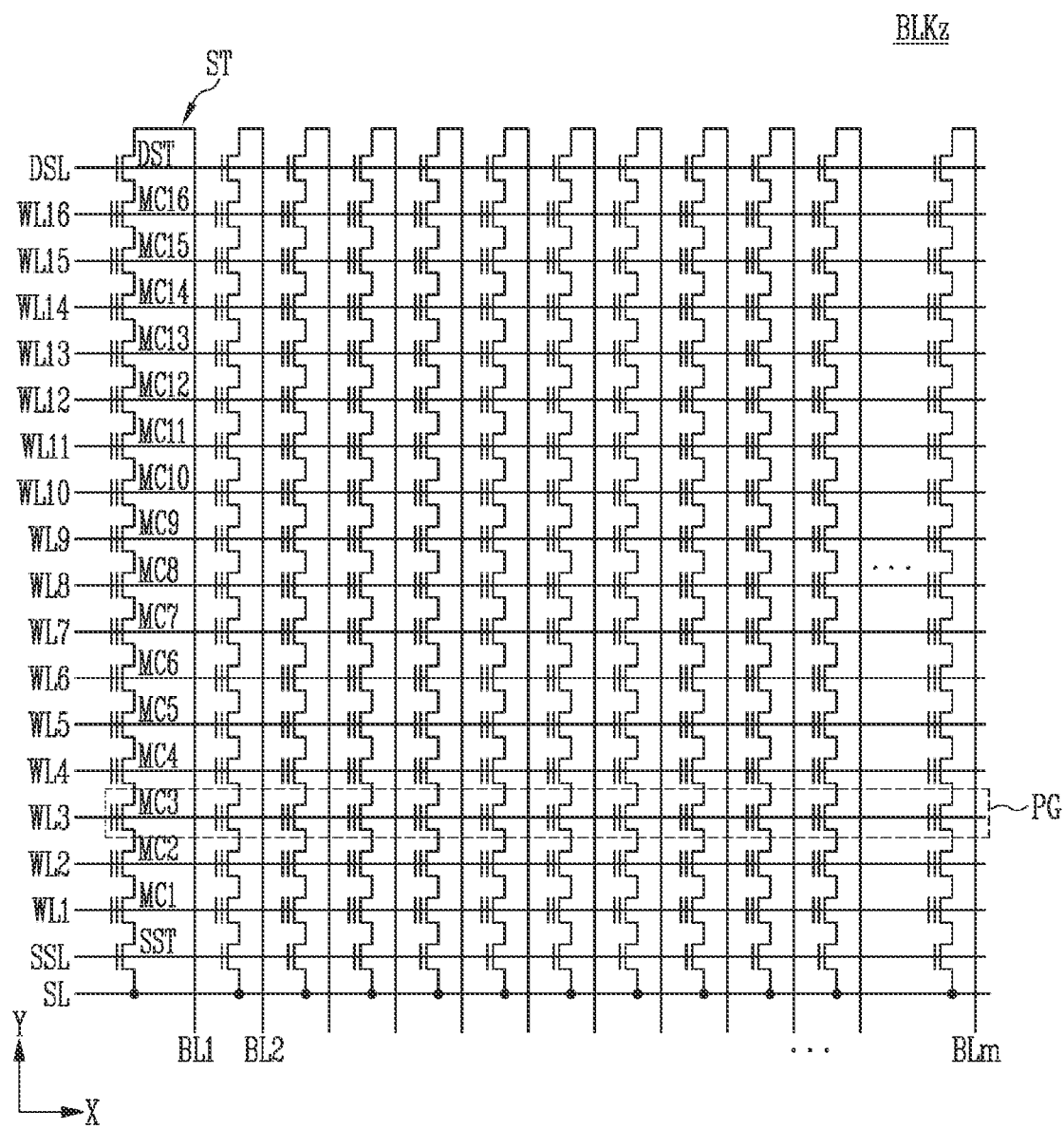
FIG. 3 is a diagram illustrating the structure of a memory block of FIG. 2 according to an embodiment of the present disclosure.

FIG. 3 is a diagram illustrating the structure of a memory block BLKz among the memory blocks BLK1 to BLKz of FIG. 2 according to an embodiment of the present disclosure.

FIG. 3 shows the memory block BLKz which is one of the memory blocks BLK1 to BLKz as shown in FIG. 2.

Referring to FIG. 3, a plurality of word lines arranged in parallel with each other may be coupled between a first select line and a second select line. The first select line may be a source select line SSL and the second select line may be a drain select line DSL. More specifically, the memory block BLKz may include a plurality of strings ST that are coupled between the bit lines BL1 to BLm and a source line SL. The bit lines BL1 to BLm may be connected to the strings ST, respectively, and the source line SL may be commonly connected to the strings ST. The strings ST may have the same configuration. Thus, the string ST which is connected to the first bit line BL1 will be described in detail as an example.

The string ST may include a source select transistor SST, a plurality of memory cells MC1 to MC16, and a drain select transistor DST that are coupled in series between the source line SL and the first bit line BL1. Each string ST may include at least one source select transistor SST, at least one drain select transistor DST, and there may be more memory cells than the memory cells MC1 to MC16 shown in FIG. 3.

A source of the source select transistor SST may be coupled to the source line SL and a drain of the drain select transistor DST may be coupled to the first bit line BL1. The memory cells MC1 to MC16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells MC1 to MC16 may be coupled to a plurality of word lines WL1 to WL16. A group of memory cells coupled to the same word line, among memory cells included in different strings ST, may be referred to as a physical page PG. Therefore, the memory block BLKz may include as many physical pages PG as the number of word lines WL1 to WL16.

A single memory cell may store one bit of data. This memory cell is generally called a single level cell (SLC). One physical page PG may store one logical page (LPG) data. One LPG data may include as many data bits as the number of cells included in one physical page PG.

One memory cell may store two or more bits of data. One physical page PG may store data corresponding to two or more logical pages LPG.

Figure 4:
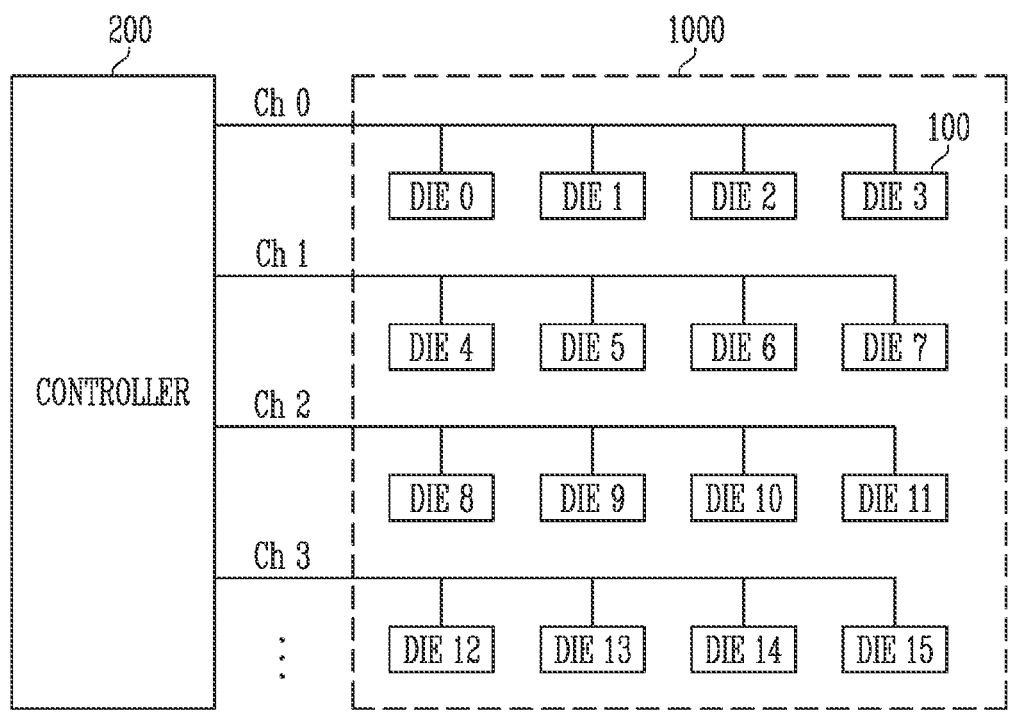
FIG. 4 is a diagram illustrating a memory package according to an embodiment of the present disclosure.

FIG. 4 is a diagram illustrating the memory package 1000 according to an embodiment of the present disclosure.

Referring to FIG. 4, the memory package 1000 may include a plurality of memory dies. Hereinafter, each of the memory dies may correspond to the memory device 100 shown in FIG. 2. As illustrated in FIG. 4, although the reference sign "100" of the memory device shown in FIG. 2 is assigned to only the #3 memory die 3, each memory die may correspond to the memory device 100 of FIG. 2. In other words, the memory package 1000 may include a plurality of memory dies like the memory device 100 shown in FIG. 2.

As shown in FIG. 4, the memory controller 200 may control a plurality of dies through channels. A predetermined number of memory dies among the plurality of memory dies included in the memory package 1000 may be coupled to the memory controller 200 through the channels. The predetermined number of the memory dies coupled to the memory controller 200 may be sequentially controlled by the memory controller 200.

According to an embodiment of the present disclosure, four memory dies DIE 0, DIE 1, DIE 2, and DIE 3 may be coupled to the memory controller 200 through a channel Ch 0. The next four memory dies (DIE 4, DIE 5, DIE 6, and DIE 7) may be coupled to the memory controller 200 through a channel Ch 1. The plurality of memory dies included in the memory package 1000 may be coupled to the memory controller 200 through the plurality of channels.

The memory controller 200 may control the plurality of memory dies coupled thereto through the plurality of channels. The memory controller 200 may control read, write and erase operations performed on a memory block coupled through a channel. More specifically, the memory controller 200 may control a read operation on a memory block included in the memory die DIE 0 through the channel Ch 0 and may control a read operation on a memory block included in the memory die DIE 1. The memory controller 200 may control operations of the memory blocks included in the memory dies DIE 2 and DIE 3. In the same manner, the memory controller 200 may control operations of memory blocks included in the memory dies DIE 4, DIE 5, DIE 6, and DIE 7 through the channel Ch 1.

Figure 5:
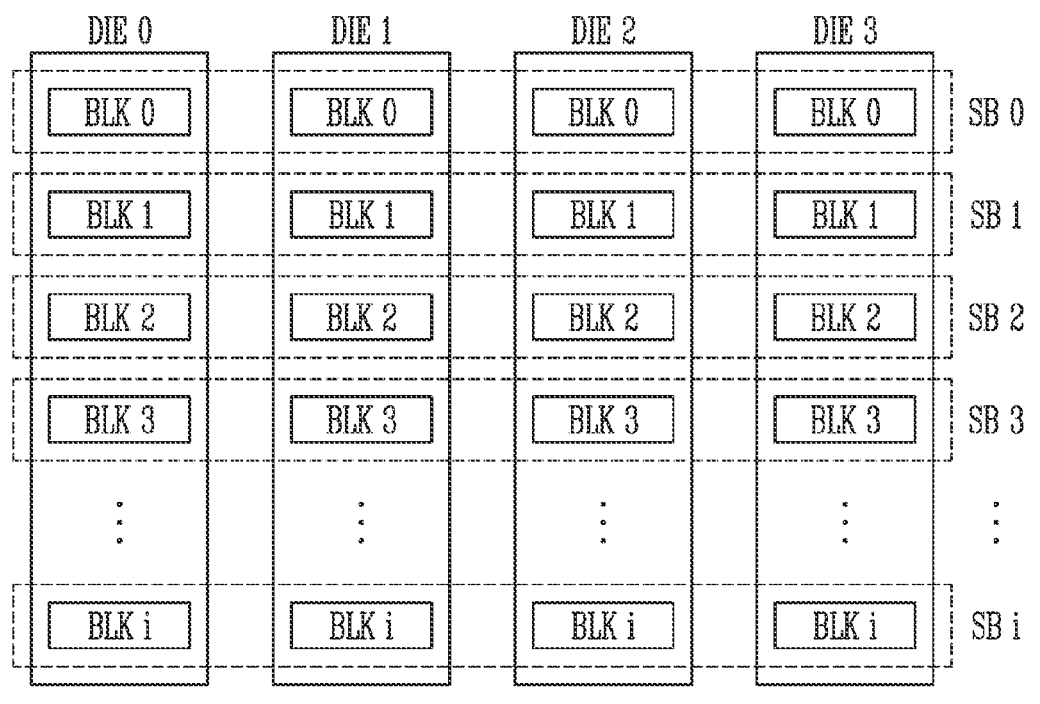

FIG. 5 is a diagram illustrating super blocks included in the memory package 1000 of FIG. 1 according to an embodiment of the present disclosure.

By way of example and without any limitation, the memory package 1000 shown in FIG. 5 includes the memory dies DIE 0, DIE 1, DIE 2, and DIE 3, and each of the memory dies includes memory blocks BLK0-BLKi.

Referring to FIG. 5, a super block that includes at least one memory die which is selected from each of the memory dies DIE 0, DIE 1, DIE 2, and DIE 3 may be generated. More specifically, a super block SB 0 may include memory blocks BLK0 that are respectively included in the memory dies DIE 0, DIE 1, DIE 2, and DIE 3. In the same manner, the super block SB 1 may include memory blocks BLK 1 that are respectively included in the memory dies. The memory package 1000 may include a plurality of super blocks.

The memory blocks included in the memory package 1000 may be controlled in units of super blocks. Referring to FIG. 4, the memory controller 200 may control operations of memory blocks included in the memory dies DIE 0, DIE 1, DIE 2, and DIE 3 through the channel Ch 0. When the memory blocks included in the memory package 1000 are controlled in units of super blocks, the memory controller 200 may control operations of memory blocks that are included in the super block SB 0.

When the memory blocks included in the memory package 1000 are controlled in units of super blocks, the memory controller 200 may sequentially control the memory blocks. In addition, operations of memory blocks included in different memory dies may not affect each other. For example, since memory blocks included in the same super block are included in different memory dies, operations of a memory block included in the memory die DIE 0 may not affect an operation of a memory block included in the memory die DIE 1.

According to an embodiment of the present disclosure, while performing a program operation on the memory block BLK 0 of the memory die DIE 0 included in the super block SB 0, the memory controller 200 may perform a read operation on the memory block BLK 0 of the memory die DIE 1 which is included in the same super block. Therefore, when operations of memory blocks are sequentially controlled, a performance speed of a memory operation may be improved.

Figures 6, 7A:
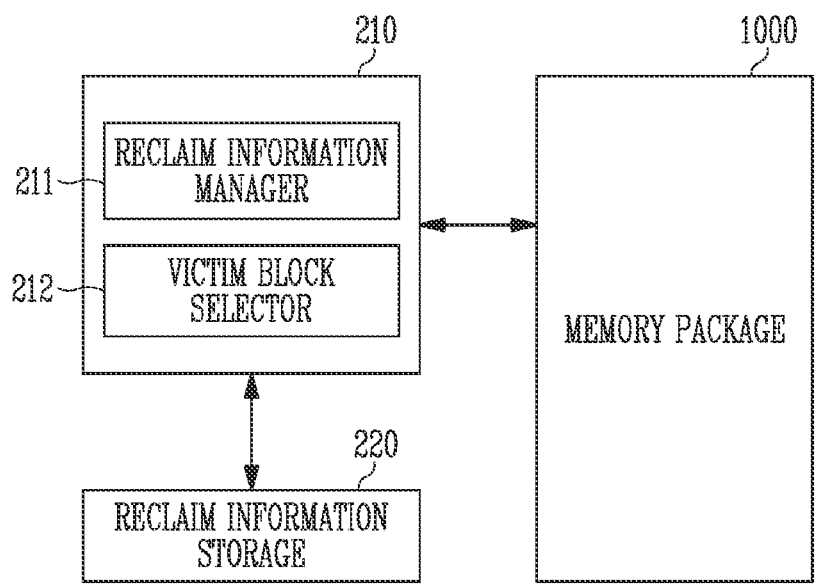
FIG. 6 is a diagram illustrating a memory controller according to an embodiment of the present disclosure.
FIG. 7A illustrates a table storing a read count of each of memory blocks according to an embodiment of the present disclosure.

FIG. 6 is a diagram illustrating the memory controller 200 according to an embodiment of the present disclosure.

Referring to FIG. 6, the memory controller 200 may include a read reclaim controller 210 and a reclaim information storage 220. The memory controller 200 may control the memory package 1000 to perform a read reclaim operation to prevent loss of data caused by a change in threshold voltage of a memory cell included in the memory package 1000.

The read reclaim controller 210 may control the memory package 1000 to perform a read reclaim operation. The read reclaim controller 210 may check a read count of each of the plurality of memory cells. When the read count of each of the memory cells exceeds a threshold count, a read reclaim operation may be triggered. The read reclaim controller 210 may store reclaim information in the reclaim information storage 220. In some embodiments, the reclaim information may include the read count of each of the plurality of memory cells and migration level information associated with the read count. When a read reclaim operation is triggered on a target block corresponding to a memory block having a read count exceeding a threshold count, the read reclaim controller 210 may migrate data stored in a plurality of victim blocks selected according to the reclaim information to another super block other than a super block to which the target block belongs. The read reclaim controller 210 may determine memory blocks having the highest migration level information among memory blocks included in other memory dies different from the memory die including the target block, among the memory dies, as victim blocks. Only one memory block in each of the memory dies may be selected and included in the victim blocks.

The read reclaim controller 210 may include a reclaim information manager 211 and a victim block selector 212. The reclaim information manager 211 may update the reclaim information corresponding to a read operation of the memory package 1000. The reclaim information manager 211 may set level information corresponding to a plurality of read count ranges to which read counts of a plurality of memory blocks belong to be included in the migration level information. More specifically, the reclaim information manager 211 may increase a read count of a memory block on which a read operation is performed. In addition, when the read count of the memory block on which the read operation has been performed exceeds the maximum value of the read count range corresponding to the migration level information (or migration level) of the memory block, the reclaim information manager 211 may increase the migration level of the corresponding memory block. When the memory blocks included in the plurality of memory dies have the same migration level, the victim block selector 212 may select a memory block having a higher read count as a victim block.

The plurality of memory dies included in the memory package 1000 may include a plurality of memory planes. The plurality of memory planes may include a plurality of memory blocks. The read reclaim controller 210 may determine victim blocks respectively from the plurality of memory planes. When the plurality of memory dies include the plurality of memory planes, reclaim information for each of the memory blocks included in the memory planes may be stored in the reclaim information storage 220.

Information related to a defense algorithm which is applied during a read operation of a memory die may be stored in the reclaim information storage 220. More specifically, information about the difference between a predetermined default read voltage of a memory die included in a memory package and a read voltage changed by the defense algorithm applied during the read operation of the memory die may be stored in the reclaim information storage 220. The read reclaim controller 210 may increase the migration level of the memory blocks included in the memory die when the difference between the predetermined default read voltage and the read voltage changed by the defense algorithm exceeds a threshold value.

In an embodiment of the present disclosure, the read reclaim controller 210 may select, as victim blocks, a predetermined number of memory blocks in descending order from highest migration level among the plurality of memory blocks. A plurality of memory blocks may be selected from the same memory die as the victim blocks.

In an embodiment of the present disclosure, the memory controller 200 may store reclaim information in the reclaim information storage 220. The reclaim information may include the read count of each of the plurality of memory cells and migration level information (or migration level)

associated with reliability of data stored in the plurality of memory blocks. The information related to the reliability of the data may include information about the difference between a predetermined default read voltage of a memory die included in the memory package and a read voltage changed by a defense algorithm applied during the read operation of the memory die. The reclaim information manager 211 may increase the migration level of memory blocks included in a heading memory die when the difference between the read voltages included in the information related to the reliability of the data exceeds a threshold value. In addition, when a read operation of a memory block included in the memory package 1000 has passed with respect to a read voltage greater than an optimal read voltage which is set during a soft decoding operation, the read reclaim controller 210 may determine the corresponding memory block as a target block. When the target block is determined, a read reclaim operation may be triggered. However, a read reclaim operation may be performed even when the read count of the memory block is less than a threshold count.

By way of example and without any limitation, in FIGS. 7A, 7B and 8, the memory package includes 4 memory dies DIE 0, DIE 1, DIE 2, and DIE 3, and each of the memory dies includes 4 memory blocks BLK 0, BLK 1, BLK 2, and BLK 3.

FIG. 7A illustrates a table storing a read count of each of the memory blocks according to an embodiment of the present disclosure. FIG. 7B illustrates a table storing migration level information (or migration level) of each of memory blocks according to an embodiment of the present disclosure.

Referring to the tables as shown in FIGS. 7A and 7B, a horizontal axis represents a number of a memory die, and a vertical axis represents a number of a memory block. The table as shown in FIG. 7A may store a read count of a memory block, and the table as shown in FIG. 7B may store migration level information. Read counts as shown in FIG. 7A may correspond to a plurality of read count ranges. Migration level information in FIG. 7B may correspond to or represent the plurality of read count ranges.

More specifically, when a read count is between zero to less than 50 k (i.e., 50,000), the migration level information may be Lv0. When the read count ranges from 50 k to less than 100 k, the migration level information may be Lv1. When the read count ranges from 100 k to less than 150 k, the migration level information may be Lv2. When the read count ranges from 150 k to less than 200 k, the migration level information may be Lv3. When the read count is 200 k or more, the migration level information may be Lv4. Herein, a threshold count is 199999.

FIG. 8 is a diagram illustrating a read reclaim operation according to an embodiment of the present disclosure.

The memory controller 200 as shown in FIG. 6 may control the memory package 1000 to perform a read reclaim operation. The tables as shown in FIGS. 7A and 7B may be stored in the reclaim information storage 220. In the illustrated example of FIG. 8, the reclaim information stored in the tables in FIGS. 7A and 7B is indicated on each memory block. In FIG. 8, a read reclaim operation is triggered when the read count is 200 k or more.

The read reclaim controller 210 may monitor whether a read count of a memory block 831 of a memory die 830 exceeds a threshold count. A read reclaim operation may be performed on a super block 890 which is different from a super block 850 including a target block of which the read count exceeds the threshold count. More specifically, the read reclaim controller 210 may determine victim blocks that migrate data to the super block 890. The victim blocks may be determined in the remaining memory dies 810, 820 and 840 except for the memory die 830. Two memory blocks (812 and 814) may have the highest migration level (i.e., Lv 2) in the memory die 810. The victim block selector 212 may select, as a victim block, the memory block 814 having a higher read count (i.e., 115k) among memory blocks 812, 814 having the same migration level (i.e., Lv 2). There may be one memory block 822 which has the highest migration level (i.e., Lv 3) in the memory die 820. The memory block 822 may be selected as a victim block. There may be one memory block 843 which has the highest migration level (i.e., Lv 3) in the memory die 840. The memory block 843 may be selected as a victim block.

The read reclaim controller 210 may migrate data stored in the target block 831 and the victim blocks 814, 822, and 843 to another super block 890. In the illustrated example of FIG. 8, the data in the blocks 831, 814, 822, and 843 may be migrated to the same memory die. However, the read reclaim controller 210 may migrate the data regardless of memory die numbers.

According to another embodiment of the present disclosure, the read reclaim controller 210 may select a predetermined number of memory blocks as victim blocks in descending order from the highest migration level among the plurality of memory blocks. Three victim blocks 821, 822, and 843, which have migration levels Lv 3, Lv 2, may be selected. A victim block may not be selected from the memory die 810.

Figure 9:
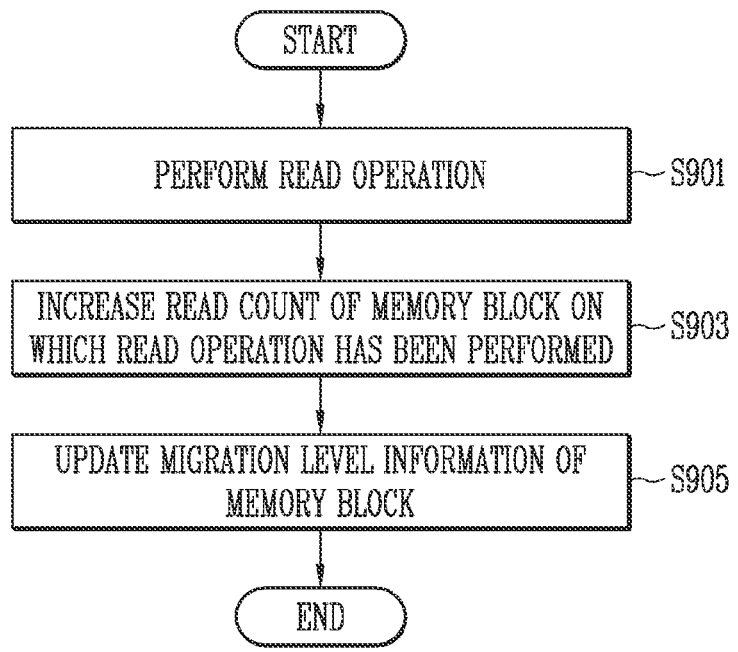
FIG. 9 is a flowchart illustrating a method of storing reclaim information according to an embodiment of the present disclosure.

FIG. 9 is a flowchart illustrating a method of storing reclaim information according to an embodiment of the present disclosure. The method of FIG. 9 may be described with reference to FIGS. 1 and 6.

Referring to FIG. 9, at operation 901, the memory controller 200 may perform a read operation on the memory package 1000. When the read operation is performed, a threshold voltage value of a memory cell may be changed. To prevent loss of the stored data caused by the change in the threshold voltage value of the memory cell, a read reclaim operation may be performed.

At operation S903, the reclaim information manager 211 may increase a read count of a memory block on which the read operation has been performed. The read reclaim controller 210 may store reclaim information in the reclaim information storage 220. In some embodiments, the reclaim information may include the read count of the memory block and migration level information associated with the read count. The reclaim information manager 211 may determine, as the migration level information, level information corresponding to a plurality of read count ranges to which read counts of a plurality of memory blocks belong.

At operation S905, the reclaim information manager 211 may update the migration level information of the memory block according to the increased read count. More specifically, when the read count of the memory block on which the read operation has been performed exceeds the maximum value of the read count range corresponding to the level information of the memory block, the reclaim information manager 211 may increase the migration level of the memory block. According to another embodiment, when there is a difference between a predetermined default read voltage of a memory die included in a memory package and a read voltage changed by a defense algorithm applied during the read operation of the memory die, the reclaim information manager 211 may increase the migration level of memory blocks included in the corresponding memory die.

Figure 10:
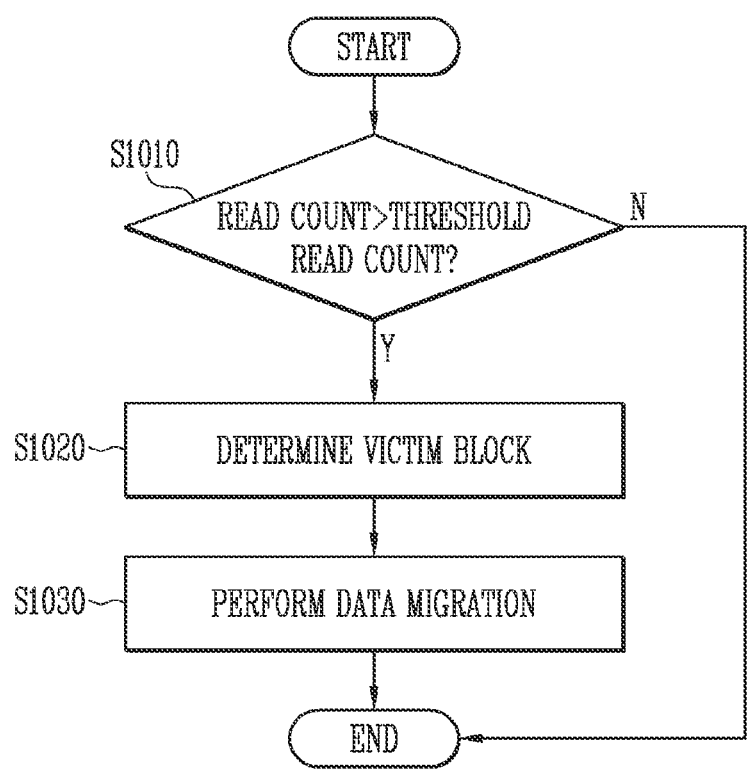
FIG. 10 is a flowchart illustrating a method of performing a read reclaim operation according to an embodiment of the present disclosure.

FIG. 10 is a diagram illustrating a method of performing a read reclaim operation according to an embodiment of the present disclosure. The method of FIG. 10 may be described with reference to FIGS. 1 and 6.

Referring to FIG. 10, at operation S1010, the read reclaim controller 210 may determine whether a read count of a memory block exceeds a threshold read count. When the read count of the memory block does not exceed the threshold read count, the read reclaim operation may be terminated without being performed. According to another embodiment of the present disclosure, the read reclaim controller 210 may determine whether to trigger the read reclaim operation depending on whether read of the memory block included in the memory package passes with respect to a read voltage higher than an optimal read voltage which is set during a soft decoding operation. When the read of the memory block included in the memory package 1000 passes with respect to the read voltage higher than the optimal read voltage set during the soft decoding operation, it may be considered that the read count of the corresponding memory block may exceed the threshold read count.

At operation S1020, the read reclaim controller 210 may determine victim blocks. The victim blocks may be a plurality of memory blocks that are selected according to the reclaim information. Data stored in the victim blocks, along with data stored in a target block having a read count which exceeds the threshold read count, may be migrated to another super block. The read reclaim controller 210 may select, as the victim blocks, memory blocks having the highest migration level among memory blocks included in other memory dies different from the memory die including the target block, among the memory dies. According to another embodiment of the present disclosure, the read reclaim controller 210 may select, as victim blocks, a predetermined number of memory blocks in descending order from the highest migration level among the plurality of memory blocks.

At operation S1030, the read reclaim controller 210 may migrate the data stored in the target block and the victim blocks to another super block different from the super block to which the target block belongs.

According to another embodiment, the read reclaim operation may be triggered when the read count of any of the plurality of memory blocks exceeds the threshold count. As the read reclaim operation is quickly triggered, loss of the data caused by the shift of the threshold voltage of the memory cell may be avoided.

According to an embodiment of the present disclosure, only memory blocks requiring read reclaim may be selected and subject to the read reclaim. The reclaim number may be reduced as compared to the migration of the data included in the super block including the memory block requiring the read reclaim.

According to embodiments of the present disclosure, a period in which read reclaim is performed may be distributed by migrating data stored in victim blocks corresponding to memory blocks having higher migration level information as well as data stored in a target block during a read reclaim operation.

Figure 11:
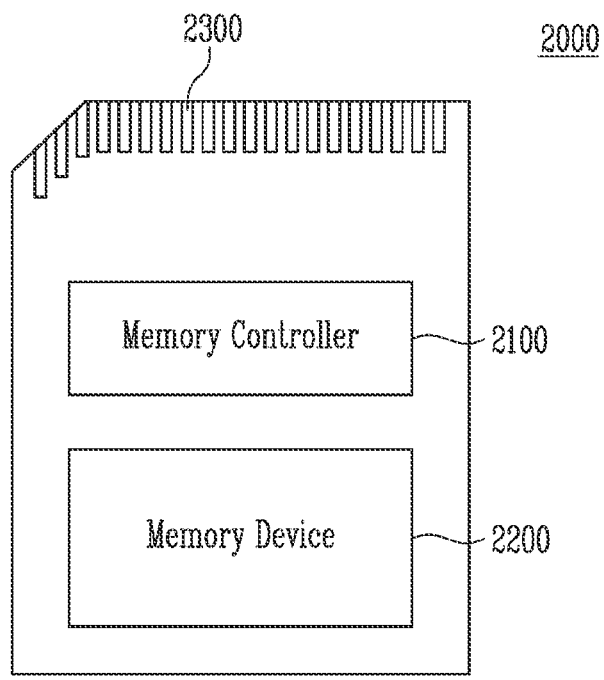
FIG. 11 is a block diagram illustrating a memory card system to which a storage device according to an embodiment of the present disclosure is applied.

FIG. 11 is a block diagram illustrating a memory card system 2000 to which a storage device according to an embodiment of the present disclosure is applied.

Referring to FIG. 11, the memory card system 2000 may include a memory controller 2100, a memory device 2200, and a connector 2300.

The memory controller 2100 may be coupled to the memory device 2200. The memory controller 2100 may access the memory device 2200. For example, the memory controller 2100 may control read, write, erase, and background operations of the memory device 2200. The memory controller 2100 may be configured to provide an interface between the memory device 2200 and the host. The memory controller 2100 may be configured to drive firmware for controlling the memory device 2200. The memory controller 2100 may have the same configuration as the memory controller 200 described above with reference to FIG. 1.

In an embodiment, the memory controller 2100 may include components, such as a Random Access Memory (RAM), a processing unit, a host interface, a flash interface, and an ECC circuit.

The memory controller 2100 may communicate with an external device through the connector 2300. The memory controller 2100 may communicate with an external device (e.g., host) based on a specific communication protocol. In an embodiment, the memory controller 2100 may communicate with the external device through at least one of various communication standards or interfaces such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), WiFi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), a Spin Transfer Torque Magnetic RAM (STT-MRAM).

The memory device 2200 and the memory controller 2100 may be integrated into a single semiconductor device to form a memory card. For example, the memory controller 2100 and the memory device 2200 may be integrated into a single semiconductor device and form a memory card, such as a personal computer memory card international association (PCMCIA), a compact flash (CF) card, a smart media card (SM or SMC), a memory stick, a multimedia card (e.g., MMC, RS-MMC, or MMCmicro), a secure digital (SD) card (e.g., SD, mini-SD, microSD, or SDHC), a universal flash storage (UFS), and the like.

Figure 12:
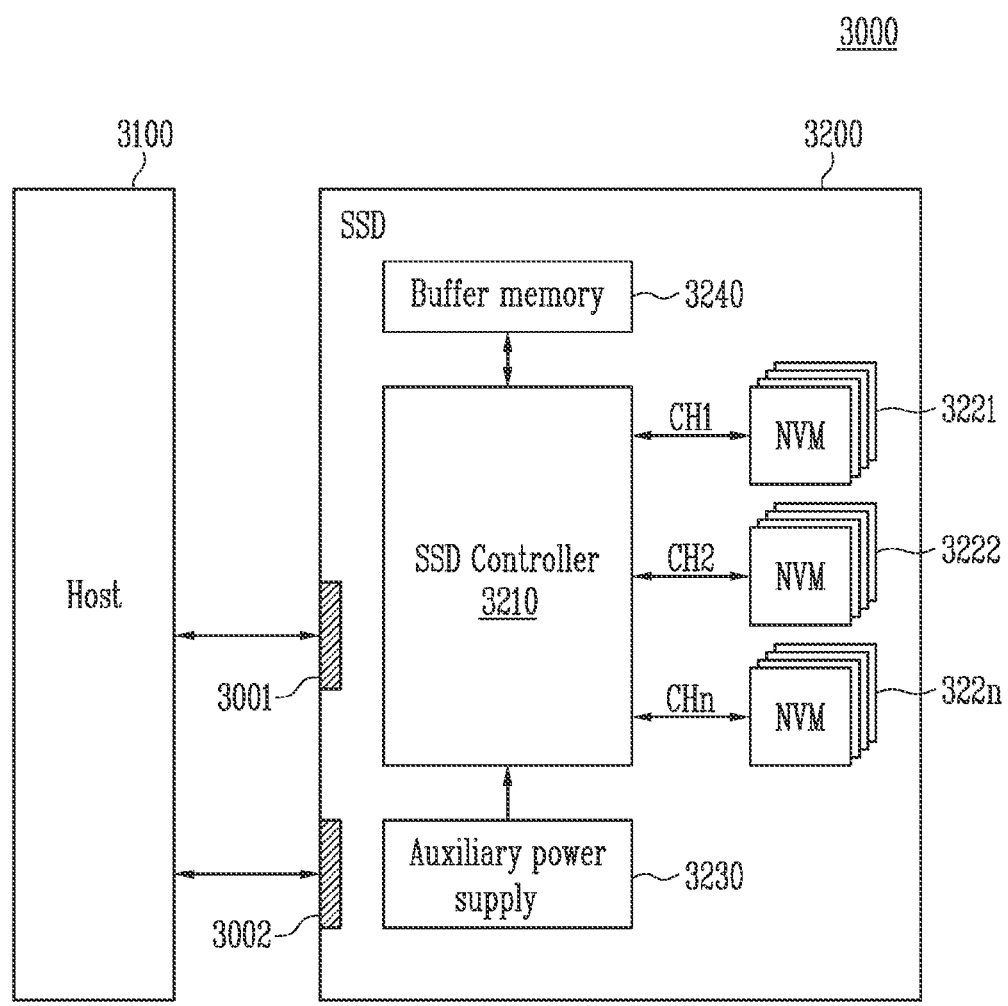
FIG. 12 is a block diagram illustrating a solid state drive system to which a storage device according to an embodiment of the present disclosure is applied.

FIG. 12 is a block diagram illustrating a solid state drive (SSD) system 3000 to which a storage device according to an embodiment of the present disclosure is applied.

Referring to FIG. 12, the SSD system 3000 may include a host 3100 and an SSD 3200. The SSD 3200 may exchange signals with the host 3100 through a signal connector 3001 and may receive power through a power connector 3002. The SSD 3200 may include an SSD controller 3210, a plurality of flash memories 3221 to 322$n$, an auxiliary power supply 3230, and a buffer memory 3240.

In an embodiment, the SSD controller 3210 may perform the function of the memory controller 200 as described above with reference to FIG. 1.

The SSD controller 3210 may control the plurality of flash memories 3221 to 322n in response to the signals received from the host 3100. In an embodiment, the signals may be based on the interfaces of the host 3100 and the SSD 3200. For example, the signals may be defined by at least one of various communication standards or interfaces such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), WiFi, Bluetooth, and nonvolatile memory express (NVMe) interfaces.

The auxiliary power supply 3230 may be coupled to the host 3100 through the power connector 3002. The auxiliary power supply 3230 may be supplied and charged with the power from the host 3100. The auxiliary power supply 3230 may supply the power to the SSD 3200 when power is not smoothly supplied from the host 3100. In an embodiment, the auxiliary power supply 3230 may be positioned inside or outside the SSD 3200. For example, the auxiliary power supply 3230 may be disposed in a main board and may supply auxiliary power to the SSD 3200.

The buffer memory 3240 may operate as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM, or nonvolatile memories such as FRAM, ReRAM, STT-MRAM, and PRAM.

Figure 13:
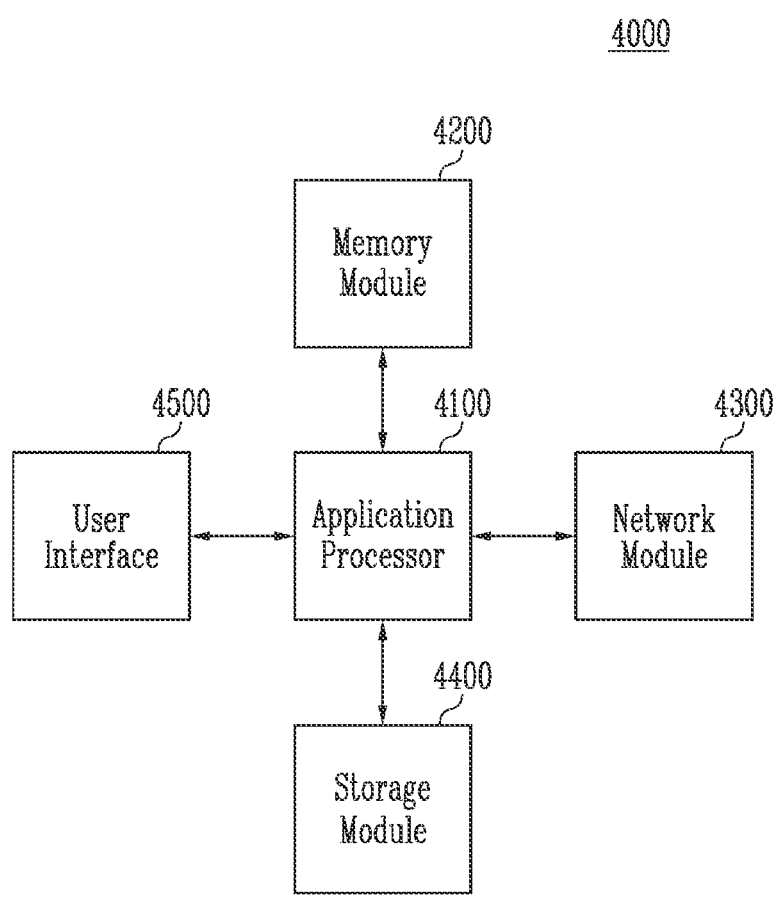
FIG. 13 is a block diagram illustrating a user system to which a storage device according to an embodiment of the present disclosure is applied.

FIG. 13 is a block diagram illustrating a user system 4000 to which a storage device according to an embodiment of the present disclosure is applied.

Referring to FIG. 13, the user system 4000 may include an application processor 4100, a memory module 4200, a network module 4300, a storage module 4400, and a user interface 4500.

The application processor 4100 may run components included in the user system 4000, an Operating System (OS), or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), Wimax, WLAN, UWB, Bluetooth, or WiFi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

For example, the storage module 4400 may include a plurality of non-volatile memory devices, and the plurality of non-volatile memory devices may operate in the same manner as the memory package 1000 described above with reference to FIG. 1. The storage module 4400 may operate in the same manner as the storage device 50 as described above with reference to FIG. 1.

The user interface 4500 may include interfaces which input data or commands to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

According to the present disclosure, a storage device performing an improved read reclaim operation may be provided.

Various embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory controller controlling a memory package including a plurality of memory dies each including a plurality of memory blocks, the plurality of memory blocks controlled in units of super blocks each including at least one memory block selected from each of the plurality of memory dies, the memory controller comprising:
   a reclaim information storage storing reclaim information including read counts of the plurality of memory blocks and migration level information related to the read counts; and
   a read reclaim controller migrating data stored in a target block and victim blocks to another super block different from a super block to which the target block belongs, the target block being a memory block having a read count exceeding a threshold count, among the plurality of memory blocks, and the victim blocks being selected according to the reclaim information, wherein the victim blocks include one or more memory blocks whose migration level indicates the highest migration level, among memory blocks, which are included in memory dies different from a memory die including the target block among the plurality of memory dies, wherein the migration level information includes migration levels for the plurality of memory blocks, respectively, and wherein the migration levels correspond to a plurality of read count ranges to which the read counts of the plurality of memory blocks belong.

2. The memory controller of claim 1, wherein the read reclaim controller further comprises a reclaim information manager updating the reclaim information in response to a read operation of the memory package.

3. The memory controller of claim 2, wherein the reclaim information manager sets the migration levels based on the read counts of the plurality of memory blocks.

4. The memory controller of claim 3, wherein the reclaim information manager increases a read count of a memory block on which a read operation is performed, and increases a migration level of the memory block when the read count of the memory block on which the read operation is performed exceeds a maximum value of a read count range corresponding to the migration level of the memory block.

5. The memory controller of claim 1, wherein the read reclaim controller further comprises a victim block selector selecting, as one of the victim blocks, a memory block having a higher read count when migration levels of memory blocks included in the plurality of memory dies are the same.

6. The memory controller of claim 1, wherein the plurality of memory dies include a plurality of memory planes,
the plurality of memory planes include the plurality of memory blocks, and
wherein the read reclaim controller determines the victim blocks from the plurality of memory planes.

7. The memory controller of claim 2, wherein the reclaim information manager increases the migration level of memory blocks included in a memory die of the memory package when a difference between a set default read voltage of the memory die and a read voltage changed by a defense algorithm applied during a read operation of the memory die exceeds a threshold value.

8. A storage device, comprising:
a memory package including a plurality of memory dies including a plurality of memory blocks; and
a memory controller controlling the plurality of memory blocks in units of super blocks each including selected memory blocks from the plurality of memory dies, respectively,
wherein the memory controller comprises:
a reclaim information storage storing reclaim information including read counts of the plurality of memory blocks and migration level information related to reliability of data stored in the plurality of memory blocks; and
a read reclaim controller migrating data stored in a target block and a plurality of victim blocks to another super block different from a super block to which the target block belongs, the target block being a memory block having a read count exceeding a threshold count, among the plurality of memory blocks, and the plurality of victim blocks being selected according to the reclaim information, wherein the migration level information includes migration levels for the plurality of memory blocks, respectively, wherein the migration levels correspond to a plurality of read count ranges to which the read counts of the plurality of memory blocks belong, and wherein the read reclaim controller selects, as the victim blocks, a set number of memory blocks in descending order from a highest migration level among the plurality of memory blocks.

9. The storage device of claim 8, wherein the read reclaim controller further comprises a reclaim information manager updating the reclaim information in response to a read operation of the memory package.

10. The storage device of claim 9, wherein the reclaim information manager sets the migration levels based on the read counts of the plurality of memory blocks.

11. The storage device of claim 9, wherein the reclaim information manager increases a read count of a memory block on which a read operation is performed, and increases a migration level of the memory block when the read count of the memory block on which the read operation is performed exceeds a maximum value of a read count range corresponding to the migration level of the memory block.

12. The storage device of claim 8, wherein the read reclaim controller further includes a victim block selector selecting a memory block having a higher read count when migration levels of the plurality of memory blocks are the same.

13. The storage device of claim 9, wherein the migration level information related to the reliability of the data includes information about a difference between a set default read voltage of a memory die included in the memory package and a read voltage changed by a defense algorithm applied during a read operation of the memory die, and
wherein the reclaim information manager increases migration levels of memory blocks included in the memory die when the difference included in the migration level information related to the reliability of the data exceeds a threshold value.

14. The storage device of claim 13, wherein when a read operation of a memory block included in the memory package has passed with respect to a read voltage higher than an optimal read voltage set during a soft decoding operation, the read reclaim controller determines the memory block as the target block.

15. A method of operating a memory controller controlling a memory package including a plurality of memory dies each including a plurality of memory blocks, the plurality of memory blocks controlled in units of super blocks each including at least one memory block selected from each of the plurality of memory dies, the method comprising:
storing reclaim information including read counts of the plurality of memory blocks and migration level information related to the read counts; and
migrating data stored in a target block and a plurality of victim blocks to another super block different from a super block to which the target block belongs, the target block being a memory block having a read count exceeding a threshold count, among the plurality of memory blocks, and the plurality of victim blocks being selected according to the reclaim information,
wherein the plurality of victim blocks include one or more memory blocks whose the migration level indicates the highest migration level among memory blocks which are included in other memory dies different from a memory die including the target block, among the memory dies, wherein the migration level information includes migration levels for the plurality of memory blocks, respectively, and wherein the migration levels correspond to a plurality of read count ranges to which the read counts of the plurality of memory blocks belong.

16. The method of claim 15, wherein the migrating of the data to another super block comprises updating the reclaim information corresponding to a read operation of the memory package.

17. The method of claim 16, wherein the updating of the reclaim information comprises setting the migration levels based on the read counts of the plurality of memory blocks.

18. The method of claim 17, wherein the updating of the reclaim information comprises:

increasing a read count of a memory block on which a read operation is performed; and increasing a migration level of the memory block when the read count of the memory block on which the read operation is performed exceeds a maximum value of a read count range corresponding to the migration level of the memory block.

19. The method of claim 15, wherein the migrating of the data to another super block further comprises selecting, as one of the victim blocks, a memory block having a higher read count when migration levels of memory blocks included in the plurality of memory dies are the same.

20. The method of claim 16, further comprising:

updating the reclaim information; and increasing the migration level of memory blocks included in a memory die of the memory package when a difference between a set default read voltage of the memory die and a read voltage changed by a defense algorithm applied during a read operation of the memory die exceeds a threshold value.

* * * * *